March 12, 1940.  C. T. MEYER  2,193,138
RAKE TEETH
Filed June 13, 1938
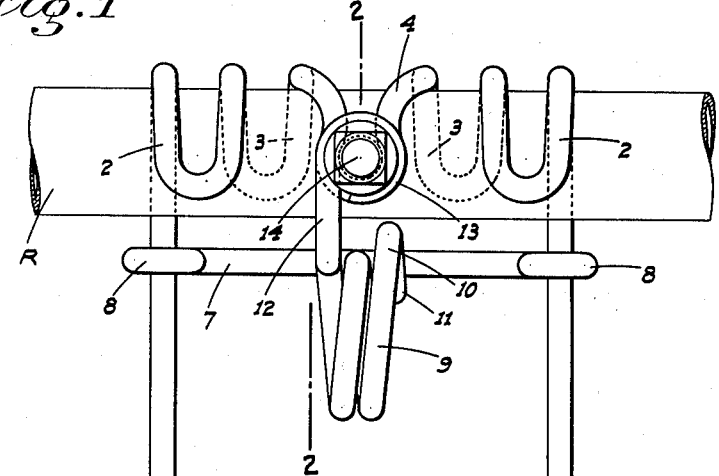
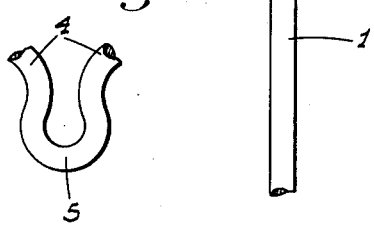
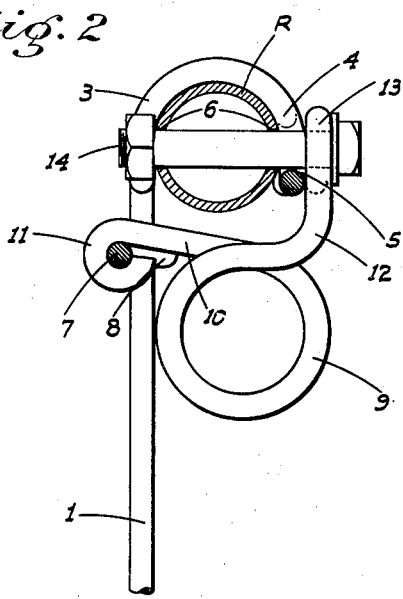
INVENTOR
C. T. Meyer
BY
ATTORNEY Patented Mar. 12, 1940

2,193,138

UNITED STATES PATENT OFFICE 2,193,138

RAKE TEETH

Conrad T. Meyer, Woodland, Calif.

Application June 13, 1938, Serial No. 213,314

9 Claims. (Cl. 56—400)

This invention relates in general to improvements in rake teeth, and in particular is directed to improved rake teeth of the type used in connection with side delivery rakes, pick up reels for harvesters and the like. In such implements, the teeth are secured on circumferentially spaced, horizontal rods rotatably mounted between spiders and the rods are controlled so that with rotation of the spiders the teeth remain in depending and substantial vertical position at all times. Such an arrangement is shown for instance in United States Patent #1,329,468.

The rake teeth now commonly in use each comprise generally a pair of parallel tines connected by an integral coil including a bolt receiving eye. In order to mount such a tooth unit on a rod, it is necessary that one end of the rod be slipped through the coil and the tooth unit slid along the rod to the point where it is to be secured. As far as initial assembly is concerned, there is no problem but, as there are a multiplicity of rake teeth mounted on each rod, if one is damaged replacement is a tedious and laborious task. The reason for this is that all the teeth units to one side or the other of the damaged unit must first be removed from the rod and to do this also requires disassembly of the rod from the supporting spider. On present implements, it often requires several hours to replace a broken or damaged tooth unit.

It is therefore the main object of this invention to provide rake teeth arranged so that the individual tooth units may each be quickly attached or detached without removal of the other units on the rod and without disassembly of the rod and supporting spider.

An additional object is to construct the rake teeth so that each unit includes shock absorbing means which tends to prevent damage to or breakage of the units when the tines strike a foreign object such as a clod of dirt or the like.

A further object of the invention is to produce a simple and inexpensive device and yet one which will be exceedingly effective for the purpose for which it is designed.

These objects I accomplish by means of such structure and relative arrangement of parts as will fully appear by a persual of the following specification and claims.

In the drawing similar characters of reference indicate corresponding parts in the several views:

Figure 1 is a front elevation of one of the improved rake tooth units attached to a rod.

Figure 2 is a cross section on line 2—2 of Fig. 1.

Figure 3 is a fragmentary view showing the bolt engaging eye of the tooth unit.

Referring now more particularly to the characters of reference on the drawing, the parallel tines 1 are the end portions of a single length of heavy spring steel wire; the intermediate portion being bent to form pairs of opposed hook like loops 2 and 3 which engage over the rod R from above and extend approximately halfway about the rods circumferentially thereof. These pairs of loops are spaced apart longitudinally of the rod, and the loop 3 of each pair is offset inwardly relative to the loops 2. Another loop 4 is formed between and connects the loops 3 and engages the rod on the same side as loops 2 and opposite to the side engaged by the inner ends of the tines 1. This loop 4 is bent to provide an eye 5 and such eye registers with a horizontal and radial hole 6 through the rod.

Rotation of the above tine structure relative to the rod is prevented by means of the following arrangement:

A horizontal cross rod 7 extends between the tines below the rod; there being eyes 8 slidably engaging said tines. A short, heavy duty helical torsion spring 9 is disposed below the rod, one end of the spring extending substantially tangent, as at 10, and being formed with an eye 11 which surrounds cross rod 7 centrally of its ends. The other end of the spring is bent upward, as at 12, and formed with an eye 13 which engages and registers with eye 5. A bolt 14 extending through eyes 13 and 5 and hole 6 secures the entire unit in place.

The device described may be quickly attached or detached as is obvious. To attach the tooth unit, the loops 2, 3 and 4 are first engaged over the rod R. The cross bar and spring are then slid into place by inserting the tines through eyes 8. Thereafter the bolt is inserted as indicated and secured in place. Attachment or detachment of a tooth unit can thus be accomplished without removing any of the other rake teeth.

The spring 9 which is connected by cross rod 7 with the tines absorbs the shock when the tines strike a foreign object and thus reduce the likelihood of damage to the unit.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A rake tooth unit for a rake, including a supporting bar, a pair of tines which comprise the end portions of a length of heavy wire, the intermediate portion being bent to form spaced pairs of opposed hook-like loops together forming a saddle straddling the bar, and means to removably secure the saddle on the bar; the loops of each pair being offset relative to each other in a direction longitudinally of the bar.

2. A rake tooth unit for a rake having a supporting rod, the unit including a pair of spaced tines, a saddle formed with the tines at their inner end of a size to straddle the rod, means to removably secure the saddle on the rod, a cross rod extending between the tines below the rod, said cross rod having end eyes slidably engaged with said tines, and a heavy duty helical spring connected at one end with said cross rod and disengageably connected at the other end with said securing means.

3. A rake teeth unit for a rake including with a supporting rod, a pair of tines, a saddle formed with the tines at their inner end of a size to straddle the rod, a loop on said saddle forming an eye, the rod having a hole therethrough to register with the eye, a securing bolt extending through said eye and hole, a cross rod extending between and slidably connected with the tines, and a heavy duty helical spring disposed below the rod with its axis parallel to the rod axis, one end of the spring being connected to the cross rod intermediate its end, and the other end of the spring being formed with an eye registering with the first named eye and likewise surrounding the bolt.

4. A rake tooth unit for a rake having a supporting rod, the unit including a pair of spaced tines adapted to depend from one side of the rod, a hook formed with and disposed between the tines at their inner end to straddle the rod from above, means to removably secure said hook on the rod, a member extending under the rod from the hook and disengageably secured in connection therewith, and an element connecting the member and tines under and adjacent the rod.

5. A rake tooth unit for a rake having a supporting rod, the unit including a pair of spaced tines adapted to depend from one side of the rod, a hook formed with and disposed between the tines at their inner end to straddle the rod from above, a cross element connecting and slidable on the tines below the rod, a member mounted on said element and extending thence under the rod to and overlapping the adjacent end of the hook and means to releasably secure the hook and member on the rod.

6. A rake tooth unit for a rake having a supporting rod, the unit including a pair of spaced tines adapted to depend from one side of the rod, a hook formed with and disposed between the tines at their inner end to straddle the rod from above, a cross element connecting the tines below the rod, a member mounted on said element and extending thence under the rod to and overlapping the adjacent end of the hook, means to releasably secure the hook and member on the rod, and a helical torsion spring formed with said member intermediate its ends, the axis of the spring being substantially parallel to the rod.

7. A rake tooth unit including with a supporting bar, a pair of spaced tines depending from one side of the bar, spaced hook elements rigid with said tines and straddling the bar from above, an eye member rigid with and intermediate the elements engaging the other side of the bar, and a securing bolt projecting through the eye and bar.

8. A rake tooth unit including with a supporting rod, a pair of tines spaced lengthwise of the rod, hooks formed with and between the tines at their upper end and straddling the rod from above whereby the tines are self supported from the rod and means removably securing the unit on the rod against movement thereon.

9. A rake tooth unit including with a supporting rod, a pair of tines spaced lengthwise of the rod, spaced pairs of alternately opposed hooks formed with and between the tines at their upper end and forming a relatively long saddle straddling the rod from above and engaging the same on opposite sides, and means removably securing the unit on the rod.

CONRAD T. MEYER.